United States Patent
Hanson et al.

(10) Patent No.: US 8,611,678 B2
(45) Date of Patent: Dec. 17, 2013

(54) GROUPING DIGITAL MEDIA ITEMS BASED ON SHARED FEATURES

(75) Inventors: Eric Hanson, Emeryville, CA (US); Joshua David Fagans, Redwood City, CA (US); Hemal Shah, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 230 days.

(21) Appl. No.: 12/891,252

(22) Filed: Sep. 27, 2010

(65) Prior Publication Data

US 2011/0235858 A1    Sep. 29, 2011

Related U.S. Application Data

(60) Provisional application No. 61/317,493, filed on Mar. 25, 2010.

(51) Int. Cl.
*G06K 9/62* (2006.01)

(52) U.S. Cl.
USPC .......................................................... 382/225

(58) Field of Classification Search
USPC .......................... 382/155, 159–161, 225–228
See application file for complete search history.

(56) References Cited

U.S. PATENT DOCUMENTS

| | | | |
|---|---|---|---|
| 5,237,648 A | 8/1993 | Mills et al. |
| 5,812,128 A | 9/1998 | Sterling |
| 5,818,437 A | 10/1998 | Grover et al. |
| 5,880,722 A | 3/1999 | Brewer et al. |
| 6,018,774 A | 1/2000 | Mayle et al. |
| 6,160,553 A | 12/2000 | Robertson et al. |
| 6,249,316 B1 | 6/2001 | Anderson |
| 6,374,260 B1 | 4/2002 | Hoffert et al. |
| 6,408,301 B1 * | 6/2002 | Patton et al. ................... 707/741 |
| 6,437,797 B1 | 8/2002 | Ota |
| 6,490,370 B1 | 12/2002 | Krasinski et al. |
| 6,542,936 B1 | 4/2003 | Mayle et al. |
| 6,545,687 B2 | 4/2003 | Scott et al. |
| 6,700,612 B1 | 3/2004 | Anderson et al. |
| 6,734,909 B1 | 5/2004 | Terane et al. |

(Continued)

FOREIGN PATENT DOCUMENTS

| | | |
|---|---|---|
| EP | 576030 A2 | 12/1993 |
| EP | 1283482 A2 | 2/2003 |
| EP | 1566752 A2 | 8/2005 |
| EP | 1729263 A2 | 12/2006 |
| JP | 03-234243 | 10/1991 |
| JP | 9027937 A | 1/1997 |
| JP | 2002259410 A | 9/2002 |
| JP | 04-274260 | 9/2004 |

(Continued)

OTHER PUBLICATIONS

Vailaya, A., Figueiredo, M. A. T., Jain, A. K., and Zhang, H.-J. 2001. Image classification for content-based indexing. IEEE Trans. Image Process. 10, 1, 117-130.*

(Continued)

*Primary Examiner* — Stephen R Koziol
*Assistant Examiner* — Sean Conner
(74) *Attorney, Agent, or Firm* — Fish & Richardson P.C.

(57) ABSTRACT

Methods, apparatuses, and systems for grouping digital media items based on shared features. Multiple digital images are received. Metadata about the digital images is obtained either by analyzing the digital images or by receiving metadata from a source separate from the digital images or both. The obtained metadata is analyzed by data processing apparatus to identify a common feature among two or more of the digital images. A grouping of the two or more images is formed by the data processing apparatus based on the identified common feature.

20 Claims, 7 Drawing Sheets

(56) References Cited

U.S. PATENT DOCUMENTS

| | | | |
|---|---|---|---|
| 6,871,231 | B2 | 3/2005 | Morris |
| 6,904,160 | B2 | 6/2005 | Burgess |
| 6,912,327 | B1 | 6/2005 | Hori et al. |
| 6,919,910 | B2 | 7/2005 | Chang |
| 7,020,848 | B2* | 3/2006 | Rosenzweig et al. ......... 715/855 |
| 7,146,576 | B2 | 12/2006 | Chang et al. |
| 7,162,488 | B2 | 1/2007 | DeVorchik et al. |
| 7,203,367 | B2* | 4/2007 | Shniberg et al. ............. 382/224 |
| 7,243,101 | B2* | 7/2007 | Itou ............................. 382/224 |
| 7,437,005 | B2 | 10/2008 | Drucker et al. |
| 7,555,165 | B2* | 6/2009 | Luo et al. ..................... 382/224 |
| 7,680,340 | B2* | 3/2010 | Luo et al. ..................... 382/224 |
| 7,707,517 | B2 | 4/2010 | Bier et al. |
| 7,747,074 | B2* | 6/2010 | Yamakado et al. .......... 382/171 |
| 7,839,420 | B2* | 11/2010 | Ubillos ........................ 345/619 |
| 7,978,936 | B1* | 7/2011 | Casillas et al. ............... 382/305 |
| 8,121,358 | B2* | 2/2012 | Weng et al. .................. 382/118 |
| 8,200,025 | B2* | 6/2012 | Woodbeck .................... 382/224 |
| 8,200,669 | B1* | 6/2012 | Iampietro et al. ............ 707/737 |
| 2001/0022621 | A1 | 9/2001 | Squibbs |
| 2002/0000998 | A1 | 1/2002 | Scott et al. |
| 2002/0051262 | A1 | 5/2002 | Nuttall et al. |
| 2002/0107973 | A1 | 8/2002 | Lennon et al. |
| 2002/0109728 | A1 | 8/2002 | Tiongson et al. |
| 2002/0143762 | A1 | 10/2002 | Boyd et al. |
| 2003/0076322 | A1 | 4/2003 | Ouzts et al. |
| 2003/0084065 | A1 | 5/2003 | Lin et al. |
| 2003/0084087 | A1 | 5/2003 | Berry |
| 2003/0169288 | A1 | 9/2003 | Misawa |
| 2004/0205633 | A1 | 10/2004 | Martinez et al. |
| 2005/0063613 | A1 | 3/2005 | Casey et al. |
| 2005/0078174 | A1 | 4/2005 | Casey et al. |
| 2005/0091596 | A1 | 4/2005 | Anthony et al. |
| 2005/0091612 | A1 | 4/2005 | Stabb et al. |
| 2005/0108620 | A1 | 5/2005 | Allyn et al. |
| 2005/0206751 | A1* | 9/2005 | Manico et al. ................ 348/239 |
| 2005/0268279 | A1* | 12/2005 | Paulsen et al. ............... 717/110 |
| 2006/0044401 | A1 | 3/2006 | Park |
| 2006/0066752 | A1 | 3/2006 | Kelliher |
| 2006/0090359 | A1 | 5/2006 | Bork |
| 2006/0114338 | A1 | 6/2006 | Rothschild |
| 2006/0155761 | A1 | 7/2006 | Van De Sluis et al. |
| 2006/0187317 | A1 | 8/2006 | Montulli et al. |
| 2006/0224993 | A1 | 10/2006 | Wong et al. |
| 2006/0251339 | A1* | 11/2006 | Gokturk et al. ............... 382/305 |
| 2007/0035551 | A1* | 2/2007 | Ubillos ........................ 345/581 |
| 2007/0058932 | A1* | 3/2007 | Wafler ......................... 386/95 |
| 2007/0098266 | A1* | 5/2007 | Chiu et al. .................... 382/224 |
| 2007/0112852 | A1* | 5/2007 | Sorvari et al. ............. 707/104.1 |
| 2007/0127833 | A1 | 6/2007 | Singh |
| 2007/0188626 | A1* | 8/2007 | Squilla et al. ............. 348/222.1 |
| 2007/0223878 | A1 | 9/2007 | Abe et al. |
| 2008/0037826 | A1* | 2/2008 | Sundstrom et al. ........... 382/103 |
| 2008/0104019 | A1 | 5/2008 | Nath |
| 2008/0148152 | A1 | 6/2008 | Blinnikka et al. |
| 2008/0170781 | A1 | 7/2008 | Woolgar |
| 2008/0174676 | A1 | 7/2008 | Squilla et al. |
| 2008/0304755 | A1* | 12/2008 | Xiao et al. .................... 382/225 |
| 2008/0304808 | A1* | 12/2008 | Newell et al. ................... 386/52 |
| 2008/0310688 | A1* | 12/2008 | Goldberg ..................... 382/118 |
| 2009/0031246 | A1 | 1/2009 | Cowtan et al. |
| 2009/0135274 | A1 | 5/2009 | Kim et al. |
| 2009/0148068 | A1* | 6/2009 | Woodbeck .................... 382/305 |
| 2010/0066822 | A1* | 3/2010 | Steinberg et al. ............... 348/77 |
| 2011/0055284 | A1* | 3/2011 | Wallace et al. ............... 707/802 |
| 2011/0055749 | A1* | 3/2011 | Wallace et al. ............... 715/772 |
| 2011/0064317 | A1* | 3/2011 | Ubillos ........................ 382/218 |
| 2011/0196888 | A1* | 8/2011 | Hanson et al. ............... 707/769 |
| 2011/0234613 | A1* | 9/2011 | Hanson et al. ............... 345/589 |
| 2012/0096361 | A1* | 4/2012 | Osten .......................... 715/731 |

FOREIGN PATENT DOCUMENTS

| | | |
|---|---|---|
| JP | 2008131330 A | 6/2008 |
| JP | 2008146191 A | 6/2008 |
| WO | WO0175645 A1 | 10/2001 |
| WO | WO2005001658 A2 | 1/2005 |
| WO | WO2005001714 A1 | 1/2005 |
| WO | WO2008079750 A2 | 7/2008 |

OTHER PUBLICATIONS hppt://www.californiacoastline.org, California Coastal Records Project, "About the Project", Photography and website, Copyright © 2002-2006 Kenneth & Gabrielle Adelman, Adelman@Adelman.com.

Notification of Transmittal of the International Search Report and the Written Opinion of the International Searching Authority for International Application No. PCT/US2008/056656, filed Mar. 12, 2008, mailed Aug. 1, 2008. Published by the European Patent Office.

Notification of Transmittal of the International Search Report and the Written Opinion of the International Searching Authority for International Application No. PCT/US2007/087660, filed Dec. 14, 2007, mailed Jul. 30, 2008. Published by the European Patent Office.

Anonymous: "Indexing and recall of capture events", Research Disclosure, Mason Publication, Hampshire, GB, vol. 422, No. 66, Jun. 1, 1999, XP007124469 ISSN: 0374-4353.

Adelman, Kenneth & Gabrielle, California Coastal Protection Network, California Coastal Records Project—Aerial Photographs of the California Coastline retrieved from: http://www.californiacoastline.org/ [online] [retrieved on Jul. 5, 2007].

Hewagamage, K.P. et al., "Augmented Album: situation-dependent system for a personal digital video/image collection"; Multimedia and Expo, 2000. ICME 2000. 2000 IEEE International Conference on New York, NY, USA, Jul. 30-Aug. 2, 2000, Piscataway, NJ, USA, IEEE, US, vol. 1, Jul. 30, 2000, pp. 323-326.

Brian K. Smith et al., Inquiry with imagery: historical archive retrieval with digital cameras, Proeedings of the seventh ACM international conference on Multimedia (Part 1), p. 405-408, Oct. 30-Nov. 5, 1999, Orlando, Florida, US.

Cato, "Digital Camera with Global Positioning Datellite to Record Location with Image", IBM Technical Disclosure, Sep. 1, 1998.

Anonymous: "Digital Camera with Global Positioning Satellite to Record Location with Image", Research Disclosure, vol. 41, No. 413, Sep. 1, 1998, XP002522567 Havant, UK, article No. 413126.

O'Hare et al., My digital photos: where and when?, ACM Multimedia 2005—13th ACM International Conference on Multimedia 2005, Nov. 6-12, 2005, Singapore.

Sony GPS tracker for photographers, Aug. 2, 2006.

U.S. Non-Final Office Action for U.S. Patent No. 11/685,672 dated Jan. 25, 2011 (13 pages).

Chinese Notification of the First Office Action (with English translation) for Application No. 200780051294.9 dated Feb. 6, 2012, 9 pages.

U.S. Non-Final Office Action for U.S. Patent No. 12/703,620 dated Feb. 9, 2012 (42 pages).

U.S. Non-Final Office Action for U.S. Patent No. 11/760,684 dated Jun. 23, 2011 (15 pages).

U.S. Final Office Action for U.S. Patent No. 11/760,684 dated Dec. 8, 2010 (20 pages).

U.S. Non-Final Office Action for U.S. Patent No. 11/760,684 dated Mar. 8, 2010 (17 pages).

U.S. Final Office Action for U.S. Patent No. 11/685,672 dated Nov. 4, 2011 (13 pages).

U.S. Final Office Action for U.S. Patent No. 11/760,684 dated Mar. 7, 2012 (14 pages).

Summons to attend oral proceedings pursuant to Rule 115(1) EPC received in EP Application No. 07855192.6 on May 15, 2013, 6 pages.

Chinese notification of office action issued in Chinese application No. 200780051294.9 on Jun. 5, 2013.

Japanese office action (with English translation) for Application No. 2010-0520035 dated Mar. 21, 2013, 15 pages.

* cited by examiner

GROUPING DIGITAL MEDIA ITEMS BASED ON SHARED FEATURES

TECHNICAL FIELD

This specification describes grouping digital media items, for example, based on shared features.

BACKGROUND

Digital media items include digital representations of content, such as, images, music, video, documents, and the like. Such media can be stored in electronic format, for example, JPEG, AVI, PDF, and the like, and transferred electronically, for example, from one data storage device to another, through electronic mail, and the like. The media can be created in one of several ways. For example, digital video images are captured using digital recorders and cameras, digital documents are created by several techniques including using suitable computer software applications, scanning hard-copies of documents, and the like, and digital music is created using audio recorders. Managing a digital media item generally describes performing one or more operations on the media items including creating, storing, transferring, editing, presenting, and the like.

In some scenarios, presenting a digital media item includes creating a composite presentation using other media items. For example, a digital still image slide show represents a composite media item that is created from the individual digital images in the slide show.

SUMMARY

This specification describes technologies relating to managing, for example, grouping digital media items based on shared features.

In general, the subject matter described here can be implemented in a method that includes receiving multiple digital images. Metadata about the digital images is obtained either by analyzing the digital images or by receiving metadata from a source separate from the digital images or both. The obtained metadata is analyzed by data processing apparatus to identify a common feature among two or more of the digital images. A grouping of the two or more images is formed by the data processing apparatus based on the identified common feature.

This, and other aspects, can include one or more of the following features. A digital composite media presentation of the multiple digital images can be created, wherein the two or more images, grouped based on the identified common feature, are presented concurrently. The analyzing, the forming, and the creating can be performed automatically without input. The metadata about the digital images can identify a time of capture of each of the digital images. The identified common feature among the two more of the digital images can be a time of capture corresponding to each of the two or more of the digital images. A difference between a time of capture of a first digital image and a second digital image, both included among the two or more of the digital images, can be within a threshold. The metadata about the digital images can identify a location of capture of each of the digital images. The identified common feature among the two more of the digital images can be a location of capture corresponding to each of the two or more of the digital images. The location of capture can include Global Positioning System (GPS) coordinates that include latitude/longitude/altitude information. A difference between a GPS coordinate of a first digital image and a second digital image, both included among the two or more of the digital images, can be within a threshold. Image information about the digital images can be obtained by analyzing the digital images. For each image, the image information can include pixel information identifying a content captured in the digital image. Image information about a first digital image can be analyzed to determine that content in the first digital image includes multiple faces. Image information about a second digital image can be analyzed to determine that content in the first digital image includes a face included in the multiple faces in the first digital image. A grouping of the first digital image and the second digital image can be formed in response to the determining. The first digital image can be presented. The face included in the second digital image that is also included in the multiple faces in the first digital image can be zoomed into.

In another aspect, the subject matter described here can be implemented in a computer-readable medium tangibly encoding computer software instructions executable by data processing apparatus to perform operations. The operations include receiving multiple digital images. Features associated with the multiple digital images are received. Each digital image is associated with corresponding features. Two or more digital images of the multiple digital images share a feature. The operations include identifying each of the two or more digital images that share the feature, and the feature that is shared by the two or more digital images. The two or more digital images that share the feature are grouped to form a cluster of related digital images. The cluster of related digital images is presented.

This, and other aspects, can include one or more of the following features. The operations can further include selecting a presentation template from multiple presentation templates. Each presentation template can be associated with at least one feature associable with a digital image. The selected presentation template can be associated with the feature shared by the digital images in the cluster. The cluster of related digital images can be presented according to the selected presentation template. The multiple digital images can be received as a sequence. The digital images included in the cluster can be out of sequence. The features associated with the multiple digital images can include metadata associated with the digital images. The two or more digital images grouped to form the cluster can share at least a portion of the metadata. The metadata can include times of capture and geographic locations of capture of the multiple digital images. The operations for identifying each of the two or more digital images that share the feature can further include identifying digital images having times of capture within a duration of time, and forming a first cluster of the digital images having the times of capture within the duration. The operations can further include identifying, from among the first cluster, digital images having geographic locations of capture within a region, and forming a second cluster of the digital images within the first cluster, wherein the digital images in the second cluster having the geographic locations of capture within the region. The operations for presenting the cluster of related digital images can further include presenting the digital images in the first cluster in a first sequence, and presenting the digital images in the second cluster in a second sequence within the first sequence. The features associated with the multiple digital images can include pixel information representing faces of persons. The operations can further include analyzing a first digital image to identify multiple faces included in the first image, analyzing a second digital image to identify a face included in the second image, determining that the face included in the second digital image is included among the multiple faces in the first digital image, and grouping the first digital image and the second digital image to form the cluster of related digital images in response to the determining.

In another aspect, the subject matter described here can be implemented in a system that includes data processing apparatus, and a computer-readable medium tangibly encoding instructions executable by the data processing apparatus to perform operations. The operations include monitoring digital images by tracking differences between metadata associated with successively captured digital images. The operations include determining that differences between metadata associated with successive images included in first multiple successively captured digital images is less than differences between metadata associated with successive images included second multiple successively captured digital images. The operations include grouping the first plurality of successively captured digital images, in response to the determining.

This, and other aspects, can include one or more of the following features. The metadata associated with the successive images can include a time of capture of each of the digital images. Each difference between times of capture associated with two successively captured digital images in the first multiple successively captured digital images can be greater than or equal to one day and each difference between times of capture associated with two successively captured digital images in the second multiple successively captured digital images can be less than one day. The metadata associated with the successively captured digital images can include a location of capture of each of the digital images. The operations for monitoring the digital images by tracking differences between the locations of capture associated with the successively captured digital images can include identifying a reference location, determining a difference between a location of capture of each successively captured digital image and the reference location, and including the digital images having locations of capture within a threshold distance from the reference location in the first plurality. The operations for monitoring digital images can include receiving the digital images, and receiving the metadata associated with the digital images. The digital images can be received from a first source. A first portion of the metadata associated with the digital images can be received from the first source, and a second portion of the metadata associated with the digital images can be received from a second source. The first multiple successively captured digital images can be captured after the second multiple successively captured digital images.

Particular implementations of the subject matter described in this specification can be implemented to realize one or more of the following potential advantages. Digital media items, for example, digital images, can be grouped based on features associated with the items, such features including either metadata or content or both. When multiple digital images are received from a source for presenting, for example, in a user interface, the images can be grouped automatically, i.e., without user intervention or additional user input. By intelligently grouping images based on shared metadata and/or the content, natural breaks between series of images can be identified. Further, the digital images can be grouped and presented in a sequence that is more contextually relevant to the user than the sequence in which the images were captured. Also, the techniques described here can decrease a time that a user spends to group images and can increase an efficiency of a computer system that can automatically group images for the user. In this manner, user experience can be enhanced. Further, by intelligently grouping images and by automating the means by which the significance of an individual image is determined, the system can present images with minimal user involvement in a way that emphasizes certain images and overall improves the story being told through those images. In addition, the techniques can aid a user in locating special images and filter images from a group of images that are potentially less significant or of lesser interest in comparison to other images in the group. Furthermore, the burden on users of authoring content as composite digital media presentations can be decreased by enabling intelligent grouping and correlation of photos.

The details of one or more implementations of the specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Digital media items can be of different types and can be obtained using different devices, each configured to obtain an item of a particular type, or using a single device configured to obtain multiple items of multiple types. In some scenarios, the item can be obtained using a digital camera or a mobile communication device, for example, a personal digital assistant, a mobile device configured to capture images, play audio/video, and the like. In some scenarios, items can be obtained using several devices, and all such obtained items can be transferred to a single computer system using which the items can be managed, for example, stored, transferred, edited for presenting, and the like.

Using techniques described later, either or both of metadata associated with and content included in digital media items, for example, digital images, are used to intelligently group one or more digital images into clusters of related digital images. It will be readily understood that the techniques described with reference to digital images are applicable to all types of digital content including digital video, digital audio, digital documents, and the like.

With reference to digital images, a cluster represents a local group of two or more digital images from among multiple digital images. Images in a cluster are related to each other, for example, the related images share at least one common feature, and are grouped based on the common feature. The clusters can be formed by a system described with reference to FIG. 1.

Figure 1:
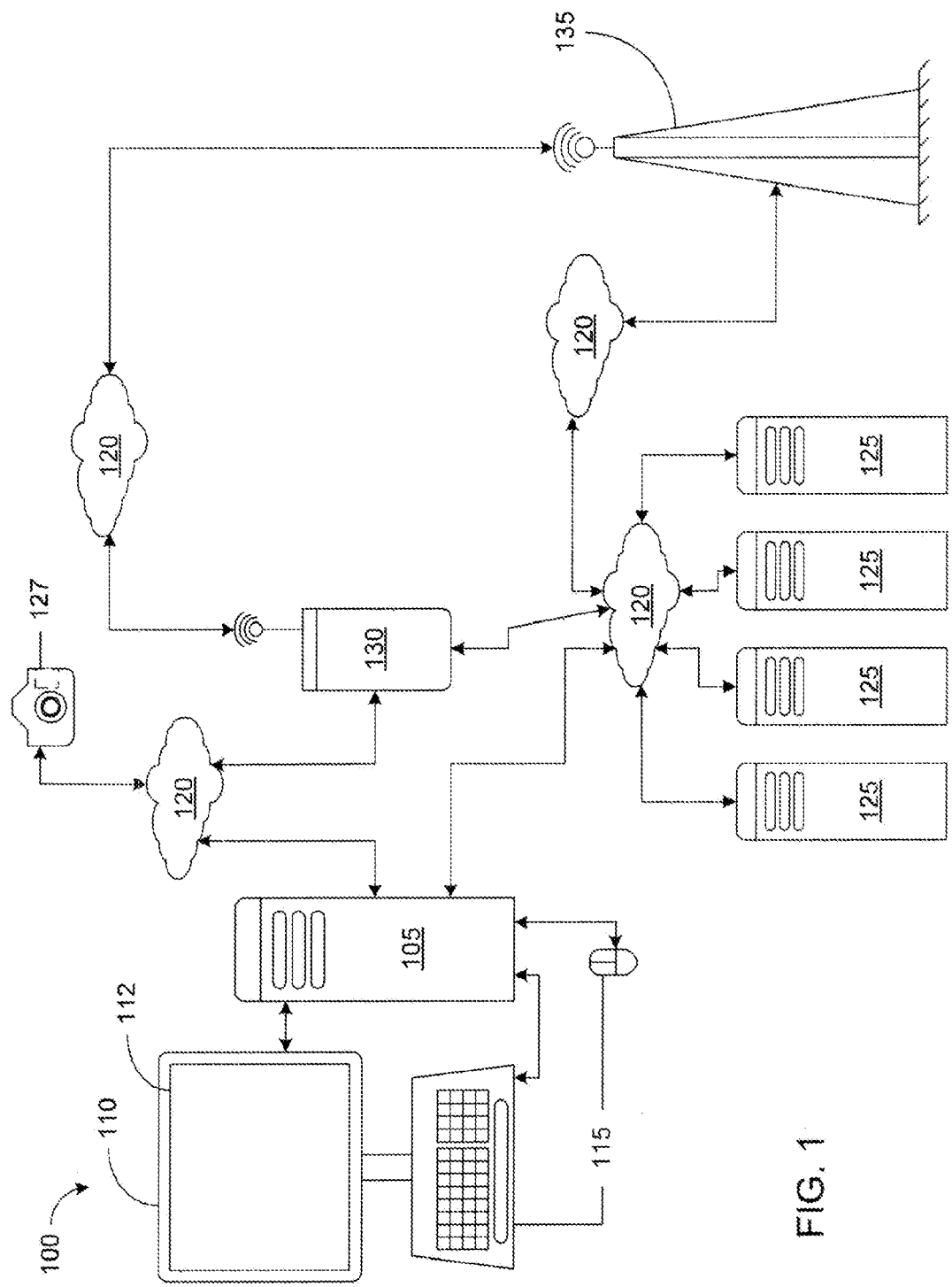
FIG. 1 shows an example system 100 for managing digital media.

FIG. 1 shows an example system 100 for managing digital media. The system 100 includes a computer system 105, for example, a desktop computer, a laptop computer, and the like, that is operatively coupled to a display device 110, for example, a liquid crystal display (LCD) monitor. The computer system 105 is configured to execute computer software instructions, the outputs of which can be displayed in the display device 110, for example, in a user interface 112. A mobile computing device 130 is coupled to the computer system 105 through the network 120. The mobile computing device 130 includes processing circuitry that is configured to execute computer software instructions, the outputs of which can be displayed in the device 110. In some implementations, the mobile computing device 130 is configured to capture digital content that can subsequently be associated with digital images. In some implementations, the device 130 is configured to capture both digital images and digital content. The following techniques, that describe grouping digital images based on shared features, can be implemented using either the computer system 105 or the mobile computing device 130 or both. Techniques using which the computer system 105 can receive the digital images are described below.

The computer system 105 can receive digital media items from a user of the computer system 105. For example, the computer system 105 operatively couples with and receives digital images from devices, such as a digital camera 127. The user captures multiple digital images using the digital camera 127; each of the digital images is stored in a data storage device, for example, a non-volatile memory card housed by the digital camera 127, a universal serial bus (USB) memory device, and the like. Subsequently, the user can transfer the captured digital images to the computer system 105 from the digital camera 127 over the networks 120. In this manner, the computer system 105 can receive digital images as data files from storage devices in response to the user's actions to transfer the images to the device 130. Alternatively, or in addition, digital images can be transferred to the computer system 105 through electronic mail (e-mail) or data networks, for example, the Internet.

Digital images include the pixel information representing the content of the digital image. The pixel information describes low-level features of each digital image that either can be obtained directly from or can be derived from the pixel information. Such information includes edges, for example, sharp color gradient changes, locations of such changes, directional orientations, and the like. From such information, the presence of straight lines and corners in an image can be determined. The information additionally describes texture, i.e., the appearance of regular patterns in the image, colors, for example, regions of relatively similar color, color palette warmth, coolness, and the like. The computer system 105 can be trained on the low-level features to recognize mid-level features, for example, foliage, sunset, beach, human faces, buildings, areas of interest, and the like. To do so, the computer system 105 can implement machine learning classifiers in some implementations.

Additionally, digital images are associated with features that describe the image. Such features include image metadata that describes properties of an image, for example, a time of capture, a geographic location of capture, a description associated with the image either by the device using which the image was capture or by a user or both, and the like. In some situations, the digital camera 127, in addition to capturing a digital image, identifies and associates the metadata, for example, the time of capture, with the digital image. In some implementations, the captured image is stored as a data file that includes pixel information, i.e., image content. The time of capture, for example, a date and time, is stored as image metadata in the data file. The metadata also includes a data file name under which the digital image is stored, file properties such as file size, file type, properties of the device using which the image was captured, for example, camera focal length, aperture settings, and the like. Thus, each image captured by the digital camera 127 is associated with corresponding metadata. Using the techniques described here, from the derived features, along with metadata, the computer system 105 can determine semantic levels of the digital images. For example, whereas the computer system 105 can derive image content based on the pixel information, the computer system 105 can arrive at comprehensions about the digital images based on the metadata.

In some implementations, the features of each digital image can also include information representing a corresponding geographic location of capture. For example, latitude/longitude/altitude information included in Global Positioning System (GPS) coordinates can be associated as metadata with each digital image data file to represent a location at which the image was captured. In some scenarios, a GPS device can be used to record the geographic location, for example, the GPS coordinates. The GPS coordinates recorded by the GPS device can be subsequently associated with the image. In some implementations, the digital camera 127 is configured to capture geographic location information along with the digital image. In such implementations, the GPS coordinates can be associated with the digital image automatically at the time of capture.

The features can additionally include text associated with a digital image. The text can be received from a user managing the digital image and can be, for example, a data file name under which the user stores the image, a caption, such as, text, that the user associates with the image, and the like. When receiving digital images, the computer system 105 can also receive the features that include either metadata or the content or both. In some implementations, the computing device 105 can receive the images and the features as data files with which the image information is associated as metadata.

Figure 2:
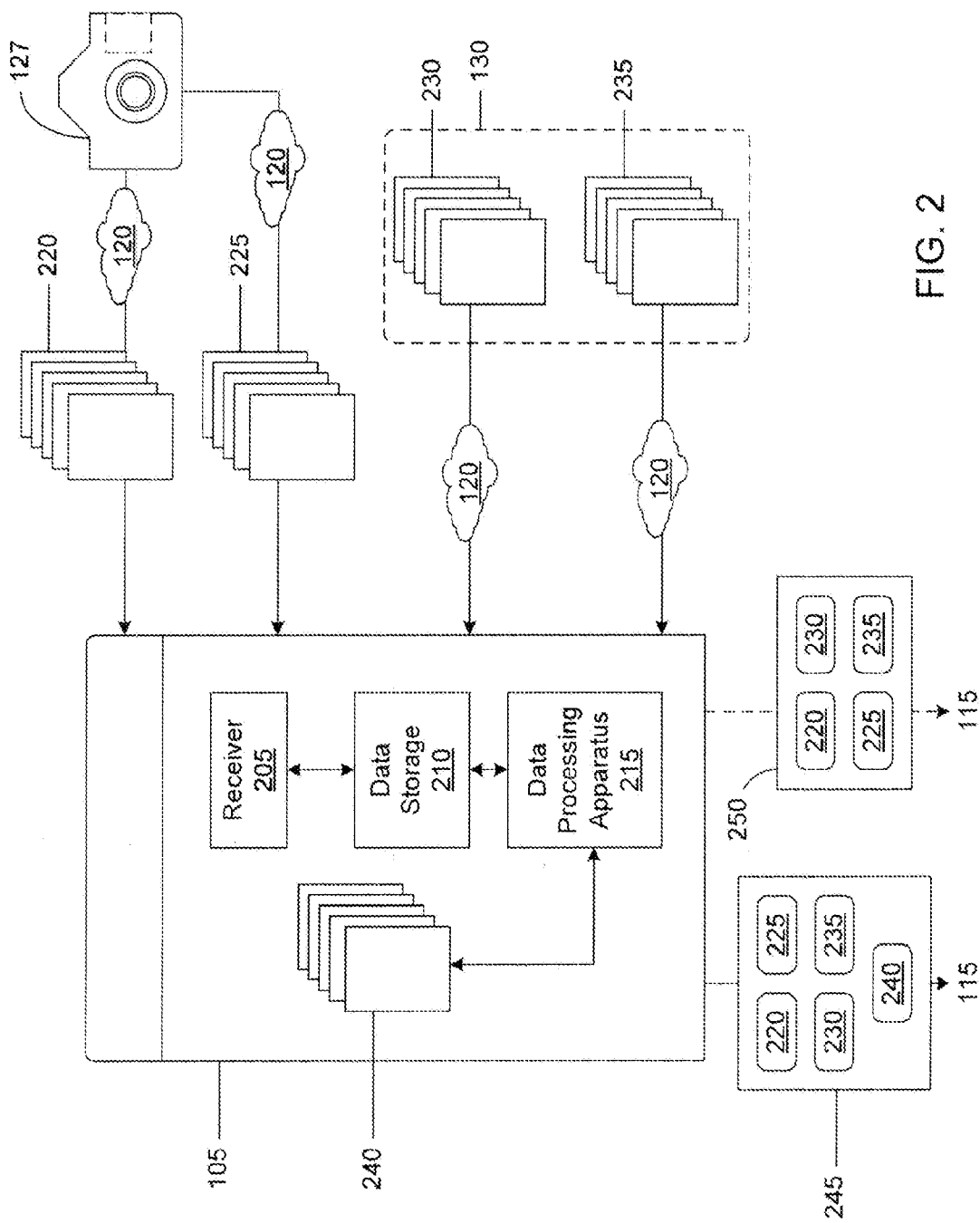
FIG. 2 shows an example computer system that exchanges information with multiple external devices.

FIG. 2 shows an example computer system 105 that exchanges information with multiple external devices. In some implementations, the computer system 105 includes a receiver 205 to receive digital images 220 and associated features 225 from the digital camera 127 through the networks 120. The receiver 205 can also receive digital images 230 and associated features 235 from the mobile computing device 130. For example, the device 130 can be a GPS coordinates-capturing device that can transfer captured coordinates to the computer system 105. Subsequently, digital images 220 can be associated with geographic location features 235 either automatically or responsive to input or both. It will be appreciated that the receiver 205 can receive the images and the features from additional devices configured to capture digital media items or features or both. The computer system 105 includes a data storage 210, for example, a hard disk, to store the digital images 220, 230 and features 225, 235 received by the receiver 205.

The computer system 105 further includes a data processing apparatus 215 configured to group two or more of the digital images received by the receiver 205. The data processing apparatus 215 is configured to execute computer software instructions to perform operations to form clusters 240 that include logically grouped digital images from among the digital images received by the computer system 105. The clusters 240 are used to create composite digital media presentations 245, 250 in which the digital images are presented, for example, displayed in the user interface 112. For example, a composite digital media presentation is a slide show that includes multiple slides, each showing multiple images. The data processing apparatus 215 can transfer the presentations 245, 250 to the display device 115 for presenting in the user interface 112.

In some situations, the computer system 105 can receive the digital images 220, 230 in a sequence in which the images were captured. In such situations, in the absence of logical grouping, images may be selected for displaying on a slide show based on a sequence in which the images are received by the receiver 205. Even if the sequence in which the digital images are received matches a sequence in which the images were captured, images displayed on the slide may not be related to each other. By implementing the techniques described here, the images can be grouped to form clusters 240, and the clusters 240 can be displayed on one or more slides such that each slide offers contextual significance to a viewer.

In one example, 100 digital images 220 are captured across five different geographical locations, for example, cities, using the digital camera 127. Geographic location features 235 for each of the cities is captured using the device 130. The computer system 105 receives, stores, and analyzes the digital images 220 and the features 235 to form five clusters, each including digital images captured in a corresponding city. In this example, each city represents a natural break in the capturing of digital images and serves as the feature based on which the digital images are grouped.

In some implementations, clusters 240 of related digital images can be formed based on times of capture of the digital images 220. Often, a user transfers digital images 220 captured over a duration of time, for example, several days, to the computer system 105. Each digital image 220 is associated with metadata 230 including a time of capture. The data processing apparatus 215 forms multiple clusters 240, each including digital images that were captured in the same day. To do so, in some implementations, the data processing apparatus 215 identifies images associated with times of capture that fall within 24 hours from the beginning of each day, for example, beginning at 12:00 am (or any alternative reference time, either computer system specified or user specified), and groups the images to form clusters 240.

In some implementations, as the receiver 205 receives the digital images 220, the data processing apparatus 215 analyzes the images 220 to identify the clusters as described previously. Upon analyzing the images 220, the data processing apparatus 215 automatically creates an composite digital media presentation, for example, a slide show, for each cluster 240. Each slide show can include multiple slides that display the images 220 in the cluster arranged in an order based on the times of capture. Alternatively, the data processing apparatus 215 can create the composite digital media presentation in response to user input to create such presentations.

In another example, the clusters 240 can be formed based on detectable intervals between capture of images. For example, multiple digital images 220 are captured within a duration that spans multiple days or weeks. A first set of images 220 are captured within a first time span, such as, one day; then, after a break spanning a duration longer than the first time span, a second set of images 220 are captured. The computer system 105 can form a first cluster 240 including the first set of images 220 and a second cluster 240 including the second set of images 220 based on the break.

To do so, in some implementations, the data processing apparatus 215 can determine a difference between times of capture of successive digital images 220, compare the differences with a threshold time, and form clusters based on the comparison. For example, the threshold time is one week. The data processing apparatus 215 receives a set of images (image 1, image 2, ..., image m, ..., image n) and determines a set of differences between times of capture ($\Delta t_{2/1}$, $\Delta t_{3/2}$, ..., $\Delta t_{m/m-1}$, ..., $\Delta t_{n/n-1}$), where $\Delta t_{2/1}$ is a difference between time of capture of image 2 and that of image 1. The data processing apparatus 215 then compares each difference in the set with the threshold. If a difference between times of capture of image m and image m−1, i.e., $\Delta t_{m/m-1}$, is less than one week, then the data processing apparatus 215 concludes that the image m−1 and image m were captured sufficiently near each other to be included in a cluster 240.

Alternatively, if the data processing apparatus 215 determines that $\Delta t_{m/m-1}$, is greater than one week, then the apparatus 215 identifies a break in the sequence of images 1-n. The data processing apparatus 215 includes image 1 to image m in a first cluster and image m+1 to image n in a second cluster. In this manner, the data processing apparatus 215 groups images 220 into clusters 240 depending on breaks in the times of capture of the images. When presenting all the images in the set in slide shows, the data processing apparatus 215 can create two slide shows such that image 1 to image m are presented in the first slide show and image m+1 to image n are presented in a second slide show.

In some implementations, the data processing apparatus 215 can infer a type of event based on elapsed time between capture of photos. For example, if each difference between times of capture of image 1 to image m is greater than a threshold, such as, one week, and differences between times of capture of image m+1 to image n is less than one week, then the data processing apparatus 215 can infer that, because image m+1 to image n were captured more frequently than image 1 to image m, image m+1 to image n were captured during an event. Based on the inference, the data processing apparatus 215 can form a cluster 240 of image m+1 to image n and group the images in the cluster 240 for presenting in a digital composite media presentation.

In some implementations, the data processing apparatus 215 can infer events based on features other than or in addition to the times of capture of the images, for example, geographic locations of capture. For example, the geographic location of the computer system 105 serves as a reference location. The data processing apparatus 215 compares the GPS coordinates of the computer system 105 with those associated with the multiple digital images 220. Based on differences between the compared GPS coordinates, the data processing apparatus 215 determines that a set of the digital images 220 were captured at a location that is away from the location of the computer system 105.

While the data processing apparatus 215 can form a cluster of digital images based solely upon the determination that the images in the cluster were captured a location away from that of the computer system 105, in some implementations, the data processing apparatus 215 can superimpose additional features to further filter the images in the cluster. For example, the data processing apparatus 215 can determine that, of the set of digital images in the cluster, times of capture of a subset of digital images is within a threshold duration, for example, one day. Based on this determination, the data processing apparatus 215 can infer that the images in the cluster represent another event and form a cluster including images of the subset.

For example, a user travels to a geographic location and captures multiple images 220 with the digital camera 127, to each of which a features 225 representing a time of capture is associated. Using the device 130, the user additionally captures features 235 representing a geographic location of capture. The user then uploads all captured digital images 220, the associated features 225 representing times of capture, and the features 235 representing geographic locations of capture. Either automatically or in response to input from the user, the features 235 representing geographic locations of capture are assigned to corresponding digital images 220.

The data processing apparatus 215 identifies all digital images that were captured at a distance greater than a threshold distance, for example, one or more of 10 miles, 20 miles, 200 miles, 500 miles, from that of the computer system 105 using the features 235. From among the identified images, the data processing apparatus 215 identifies digital images for which differences between corresponding times of capture is less than a threshold time, for example, one or more of 1 hour, 6 hours, 12 hours, 1 day, and the like. Based on the identification, the data processing apparatus 215 forms a cluster 240 including the digital images 220 that satisfy both conditions of the example. The cluster 240 includes related digital images that were taken at a location away from the user's home and within a time span. The data processing apparatus 215 presents the cluster 240 in the composite digital media presentation. In this manner, a cluster can include multiple clusters, each of which can further include one or more clusters of images.

In some implementations, the data processing apparatus 215 receives two images in succession from the digital camera 127 and determines that the images were captured at two separate geographic locations within a short time span. For example, based on the GPS coordinates associated with the two images, the apparatus 215 determines that a distance between geographic locations of capture of the two images is greater than 500 miles. Based on times of capture associated with the two images, the apparatus 215 determines that a second of the two images was captured less than one hour after a first of the two images. From the determinations, the apparatus 215 infers that, because the digital camera 127 traveled a long distance in a short duration, the user of the digital camera 127 most likely traveled from the first location to the second location in an airplane. Based on the inference, the apparatus 215 creates a break between the first and the second image. When the apparatus 215 presents the first and second images in a digital composite media presentation, the apparatus 215 displays an indication that air travel occurred between the capture of the first digital image and the second digital image. It will be appreciated that the aforementioned processes can be executed to create breaks between groups of first images that were captured at a first location and second images that were captured at a second location.

To infer that air travel occurred between the capture of two successively captured images, the data storage 210 can store, for example, in a computer-searchable table, distances and times. For example, the data storage 210 stores 500 miles and 1 hour, 2000 miles and 1 day, and so on. Based on the distance and time, the apparatus 215 determines a speed to travel between the two locations in which the two images were captured. To do so, for example, the apparatus 215 divides the distance traveled by time of travel. To determine if a break should be created, the apparatus 215 compares the determined speed with a threshold speed to determine if the threshold is satisfied. For example, if the apparatus 215 identifies that the determined speed is greater than or equal to the threshold speed, then the apparatus 215 can infer that air travel occurred.

In some implementations, the apparatus 215 can additionally determine that travel occurred by walking, biking, using cars, trains, and the like based on the speed of travel. To do so, in some implementations, the apparatus 215 can be configured to determine a normal distribution with mean being the average speed that a form of transportation will attain. Based on deviations from the mean, the apparatus 215 can infer a mode of transportation. For example, the normal distribution curve can be drawn based on the inference that users travel to geographic locations using cars driven at a mean speed of 100 km/hr with a standard deviation of 20 km/hr. Higher speeds in the distribution curve represent faster means of travel and vice versa. For each pair of consecutive images, the apparatus 215 can determine a speed of travel between the geographic locations in which the consecutive images were captured.

The apparatus 215 can then compare the speeds of travel with the distribution curve to calculate three likelihoods, each representing a likelihood that the user traveled by car, by airplane, or by foot. Based on the highest of the three likelihoods, the apparatus 215 can infer the mode of travel. If all values have the same or similar likelihoods, then the apparatus 215 may not make an inference about the mode of travel.

In some implementations, a database of GPS coordinates of all geographic locations defined for Planet Earth is stored in the data storage 210. The data processing apparatus 215 can identify a geographic location in which the each of the received images was captured by searching the GPS coordinates of the images in the cluster with those stored in the data storage 210.

In some implementations, the data processing apparatus 215 forms a cluster of digital images that were captured within a geographic location. For example, all digital images in the cluster share the same GPS coordinates because all the images were captured in the same city. Alternatively, differences between the GPS coordinates of the digital images satisfy a threshold because the digital images were captured within a threshold distance from each other. By comparing the GPS coordinates of the images in the cluster with the GPS coordinates stored in the data storage 210, the data processing apparatus 215 can identify a geographic region in which all images in the cluster were captured.

In some situations, the data processing apparatus 215 can determine that the cluster of related digital images was captured at a location that is a popular tourist destination. To do so, in some implementations, the data storage 210 can store a database of popular tourist locations and corresponding GPS coordinates. Alternatively, the computer system 105 can be operatively coupled to data hosts 125 that store both the database of GPS coordinates and the database of popular tourist destinations. To do so, the computing device 105 is operatively coupled to the data hosts 125 over the networks 120, for example, the Internet, the Wi-Fi network, a cellular telephone network provided by a service provider 135, and the like. The data processing apparatus 215 executes computer software applications that cause information to be exchanged between the computer system 105 and the data hosts 125. For example, the data hosts 125 are data servers that host websites and store digital media items that are included in the various web pages of the websites.

Upon determining that the cluster was captured at a popular tourist destination, the data processing apparatus 215 can automatically create a composite digital media presentation that includes text referring to the identified tourist destination. For example, the data processing apparatus 215 infers that the user is vacationing at the popular tourist destination, and automatically includes a slide displaying the text "Vacation" as the first slide in the slide show in which images in the cluster are displayed. In some implementations, the data processing apparatus 215 automatically applies a theme to the presentation of the images that is appropriate to the popular tourist destination. For example, the apparatus 215 determines that digital images captured on a beach in Hawaii might be presented in a print product with a default "Tropical"

theme that includes art embellishments representing items that might be found on a beach. In another example, the apparatus 215 automatically presents another group of digital images captured at a popular ski resort during winter months in a "Winter" theme.

In some situations, some of the digital images do not have associated geographic locations of capture. In some situations, no correlation is derivable from some of the received images, whereas other images are grouped to form clusters. In such situations, the apparatus 215 can form a cluster of images that do not have associated geographic locations of capture and/or images for which no correlation is derivable.

In some implementations, in addition to using features 220, i.e., metadata associated with the images, the data processing apparatus 215 can additionally use the content of the images themselves to form clusters. For example, the data processing apparatus 215 can be configured to execute software instructions to recognize that digital images include faces of people. To do so, in some implementations, the apparatus 215 can identify faces by extracting landmarks from an image of a person's face. The apparatus 215 can analyze multiple digital images and identify images that have faces of people. From among the identified images, the apparatus 215 can identify images that have faces of the same people.

In some implementations, a user captures multiple digital images 220 using the digital camera 127 at a social gathering, for example, a party. At the social gathering, the user captures images of a group of people, images of each person in the group, and images of less than all the people in the group. These images may or may not be captured successively, and can be stored in a sequence in which they were captured. For example, when the images are stored on a memory card housed in the digital camera 127, the camera 127 associates a name with each data file representing an image. The names of the data files follow a sequence, such as, "IMG001.JPG," "IMG002.JPG," and so on.

The computer system 105 receives the images in the sequence in which they are stored on the memory card and also receives the names provided to the images by the digital camera 127. In one example, "IMG001.JPG" is an image of a person, "IMG003.JPG" is an image of a group of five people, "IMG007.JPG" is an image of three people of the five people in the group, "IMG033.JPG" is an image of a second person of the five people. Upon receiving "IMG003.JPG," the data processing apparatus 215 determines that the image contains faces of five people. The data processing apparatus 215 can perform facial recognition using one of several known techniques. For example, the data processing apparatus 215 can do so by analyzing the pixel information in the image, identifying eyes based on the analysis, and determining a quantity of pairs of eyes in the image. In some implementations, the apparatus 215 can detect that an image includes multiple rectangular regions, each including pixels representing a face. Based on the detection, the apparatus 215 can conclude that the image is a group photograph. Alternatively, when the apparatus 215 detects that an image includes one rectangular region that occupies most of the digital image and includes pixels representing a face, the apparatus 215 can conclude that the image is a portrait of a single person.

Having identified that the image, "IMG003.JPG," includes faces of five persons, the data processing apparatus 215 then analyzes the pixel information of the other images received from the digital camera 127, and determines the faces in the images described above. By comparing the faces in the aforementioned images with those in the image, "IMG003.JPG," the data processing apparatus 215 determines that each of the aforementioned images includes at least one face found in the image, "IMG003.JPG," and forms a cluster of the aforementioned images. When presenting the images received from the digital camera 127, the data processing apparatus 215 presents the images in the cluster concurrently. In some scenarios, the image including all five faces can be displayed on one slide and all remaining images in the cluster can be displayed on another slide, and both slides can be displayed simultaneously in the user interface 112.

In some situations, the data processing apparatus 215 can create a cluster based on a combination of faces and time obtained from images captured by different devices and/or imported at completely different times. For example, in a social event, a first user captures a first set of digital images and a second user, also at the social event, captures a second set of digital images. The data processing apparatus 215 can receive the first set and the second set concurrently or one after the other. The apparatus 215 can automatically, i.e., without user input or user intervention, correlate the digital images in both sets based on the presence of faces in the digital images and on the times at which the images were captured. By doing so, the cluster is organized to include both sets of digital images, all of which can be included in a presentation of the event (for example, a slideshow).

In some situations, the data processing apparatus 215 can identify multiple digital images having the same faces, and form of a cluster of the identified faces. Additionally, by analyzing the GPS coordinates associated with the images in the cluster, the data processing apparatus 215 can determine that all images in the cluster were taken at a location away from the computer system 105. Further, by analyzing the times of capture of the images, the apparatus 215 can determine that all images in the cluster were taken within short durations from each other, for example, in the same day, over a course of two days, in the same week, and the like. Furthermore, by comparing the GPS coordinates of the images in the cluster with the database of geographic locations, the apparatus 215 can determine that all images in the cluster were captured at a popular tourist destination, such as Disney World. Based on the aforementioned determinations, the apparatus 215 can infer that the user, and all members of the user's family, were at a family vacation in Disney World. The composite digital media presentation in which the apparatus 215 presents the cluster can be selected to represent a vacation and more particularly, one in Disney World.

In some implementations, the apparatus 215 can analyze multiple digital images and identify a face that is common to some of the analyzed images. The apparatus 215 can further determine that, although there are additional faces in the analyzed images that include the identified face, the additional faces do not appear in any of the analyzed images any regularity. For example, out of 10 analyzed images, the apparatus 215 determines that eight images share a common face, and that one or more of the additional faces appear in less than three or four of the eight images. Based on the determination, the apparatus 215 groups the eight images that share the common face to form a cluster. In some scenarios, the apparatus 215 does not form other clusters based on the other faces or alternatively forms clusters based on the other faces.

In some implementations, the apparatus 215 can analyze occurrences of specific sets of faces in individual images across multiple digital images. Based on the analysis, the apparatus 215 can infer general relationships between the faces. For example, for a reference image of a user, the apparatus 215 can infer images of the user's friends or family distinguished from those of relative strangers. To do so, in some implementations, the apparatus 215 can infer individuals that are significant to the reference image of the user based on a frequency of appearances of the reference image with a set of images of people previously identified by the user. The apparatus 215 can then correlate images of a significant individual with the relative size of images of the faces of the user and the significant individual in a group photograph as a measure of prominence. In addition, the apparatus 215 can correlate images using additional external information about each individual derived from other available sources, for example, interactions by the user with images of a particular individual. From the frequently-appearing sets of images of people and the proportion of images with large, prominent views of a significant individual, the apparatus 215 can infer images of individuals that are important to the user.

Based on these inferences, the apparatus 215 can associate a weight to images including faces to determine if a face in an image is important. For example, an image including a face of a user's wife is important whereas one including a face that is found only once in multiple images is less important. The apparatus 215 can group images including faces determined to be important, and create a cluster of grouped images. Further, the apparatus 215 can present the grouped images in a presentation, for example, with a theme entitled "Friends and Family."

In some implementations, the apparatus 215 can analyze bounding face rectangles in an image to identify a group shot. From the rectangles, the apparatus 215 can derive sets of features or values from the mean, median, standard deviation, and other statistically relevant information of the sizes of the face rectangles, the number of faces, statistical information describing the distance of each face from the center of the digital image, statistical information about the distance of each face to the bounding rectangle around all the faces, deviation of the location of the faces to a regular grid, and the like. The apparatus 215 can be trained, for example, by implementing machine learning classifiers, to recognize the patterns of these measurements for different group shot types (close-up, portrait, wide group shot, and the like).

When presenting the images in the cluster in a digital composite media presentation, the data processing apparatus 215 can focus on the face that is common to the images in the cluster. For example, the apparatus 215 can present the images through a real-time Ken Burns effect in which the face that is shared by the images is zoomed in and in focus whereas the other faces in the image remain out of focus. Alternatively, or in addition, the apparatus 215 can automatically apply a "multi-pass" Ken Burns effect to a single image based on a similar inference as described above. In the multi-pass Ken Burns effect, when two significant faces appear distant from each other in a group shot, the apparatus 215 can automatically pan to one face, zoom in, then slowly zoom out while panning to the second face and zoom in again.

In some implementations, the apparatus 215 can form separate clusters of landscape and portrait images, and present each cluster in a unique manner. A portrait image is a digital image that includes a face of a person and the expression of the person's face is predominant in the image. In some scenarios, the amount of image area in the portrait image is significant, for example, at least 25% and up to 95% (close-up). In some implementations, the apparatus 215 can infer that art image is a portrait image based on the focal length of the lens used to capture the digital image. The focal length can be included in the image metadata, for example, EXIF metadata. In some implementations, the apparatus 215 can determine that images are portrait images based on very short time intervals between consecutive images, i.e., when the images are captured in a burst.

A landscape image is one that does not include a face or one in which a face (or faces) are insignificant, for example, are very small in size, have undetectable features, and the like. In some implementations, the apparatus 215 can infer a landscape image from the focal length of the lens. Typically, focal lengths of landscape images are fairly short relative to portrait images. Thus, in some implementations, the apparatus 215 can distinguish portrait and landscape images based on the field of view of the lens using which the image was captured, the field of view information being included in the image metadata.

Upon inferring that a digital image is either a portrait image or a landscape image, the apparatus 215 can present the image using a frame treatment that varies based on the image. For example, a portrait image in a particular slideshow theme can be displayed in a "Polaroid-style" frame whereas a landscape image can be displayed in a "postcard" frame. When the apparatus 215 applies a Ken Burns effect to images, the presentation can be varied for landscape images in comparison to portrait images. For example, the apparatus 215 can sweep across a landscape image and zoom in on a face in the portrait image.

In some implementations, the apparatus 215 can form clusters of images based on input pertaining to the images received from a user of the computer system 105. For example, the apparatus 215 can manipulate a cluster of images based on user rating associated with the images. More specifically, the apparatus 215 forms a cluster based on the aforementioned features and the content of the images. Subsequently, based on user ratings of images in the cluster, the apparatus 215 can arrange a sequence in which the images in the cluster are to be presented in a composite digital media presentation. Alternatively, or in addition, images that have received high user ratings can be shown in larger sizes relative to other images in the cluster.

In addition to ratings, the apparatus 215 can form and/or manipulate clusters based on a duration for which users view the images, edit the images or both. For example, in a slide show of a cluster of images, often viewed images can be presented on a separate slide whereas two or more of the remaining images can be grouped on another slide. In some situations, the computer system 105 can receive images from sources other than the digital camera 127, for example, via e-mail. Because an image was received from a source other than the digital camera 127, the image can be given less prominence compared to other images in the cluster during a composite digital media presentation. It will be appreciated that if the user gives the image received via e-mail a higher rating and/or views the image more often than other images in the cluster, then the image received via e-mail is given more prominence compared to other images in the cluster during the presentation. In some scenarios, the computer system 105 can track a number of times an image was sent from the system 105 via e-mail to someone else. Images that were sent frequently or to a large number of recipients can be considered more relevant than other images and as such may receive higher prominence in a presentation.

In some situations, the user can associate text with a digital image, for example, a caption, a file name, and the like. More specifically, the user can associate significant text, for example, long lines of text, to some images that the user considers important and relatively insignificant or no text to less important images. The apparatus 215 can form a cluster based on the text associated with the images. When presenting the images in the cluster, the apparatus 215 can prominently display the text associated with each image along with the image, for example, as an image overlay.

Figure 3:
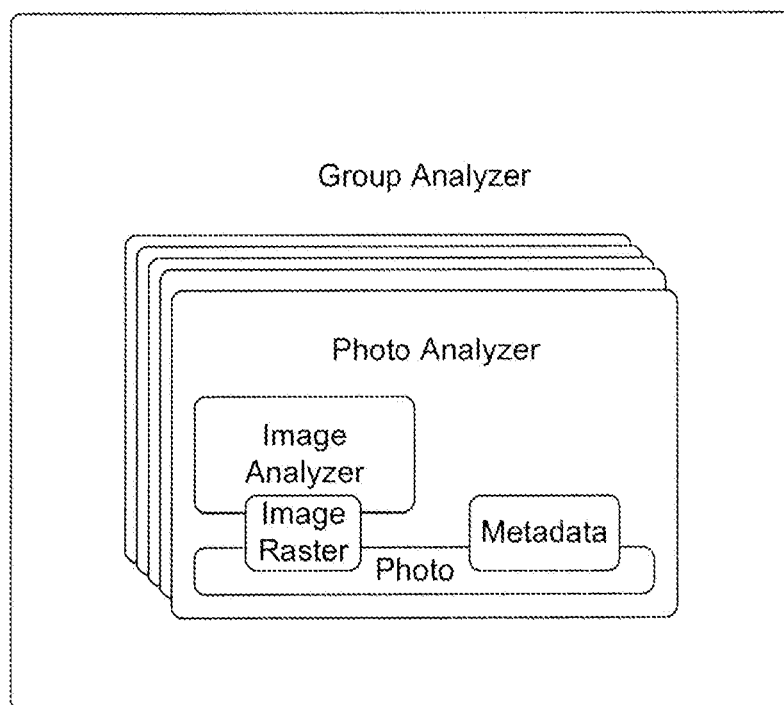
FIG. 3 shows a hierarchy of image contexts.

FIG. 3 shows a hierarchy of image contexts. In some implementations, the computer system 105 considers inferences in a hierarchy of contexts: a group of photos, a photo within the context of a group, a photo, an image in the context of a photo, and an image. The computer system 105 described above can derive or infer new information in the form of a set of semantically-significant keywords about a photo or a group of photos by analyzing low-level image features and building up intermediate-level conclusions by correlating photo- and group-level characteristics. Some implementations of the computer system 105 can derive intermediate-level conclusions from low-level image features and correlate other characteristics into inferences in the form of keywords through a variety of modeling techniques such as in the form of a Bayesian network, as described below. The system 105 uses three context levels: Groups, Photos, and Images. Photo is an actualized context within the computer system 105. Groups exist as a collection of particular photos and any inferences generated about a group are ephemeral in that changing the group in any way would invalidate them. Images refer to rasters of pixels that have no relationship to a photo and therefore are also considered transient. For example, the computer system 105 can analyze a generated bitmap that is not a photo. Thus, the image context is a raster, the photo context encompasses the entire photo, and the group context encompasses a collection of photos.

Photo is an actualized context within the computer system 105 that includes photo characteristics such as associated EXIF metadata (focal length, photo date, and the like) and any other photo information in addition to the image raster that comprises the physical representation of the photo. The image context includes only the image raster disassociated from any additional meta-information and may or may not be associated with a photo. All low-level image analysis features exist within the image context. The Group context comprises of an ordered set of photos and encompasses any inferences made about the photos as a group, such as whether they represent an event that could be classified as a certain occasion or activity.

Figure 4:
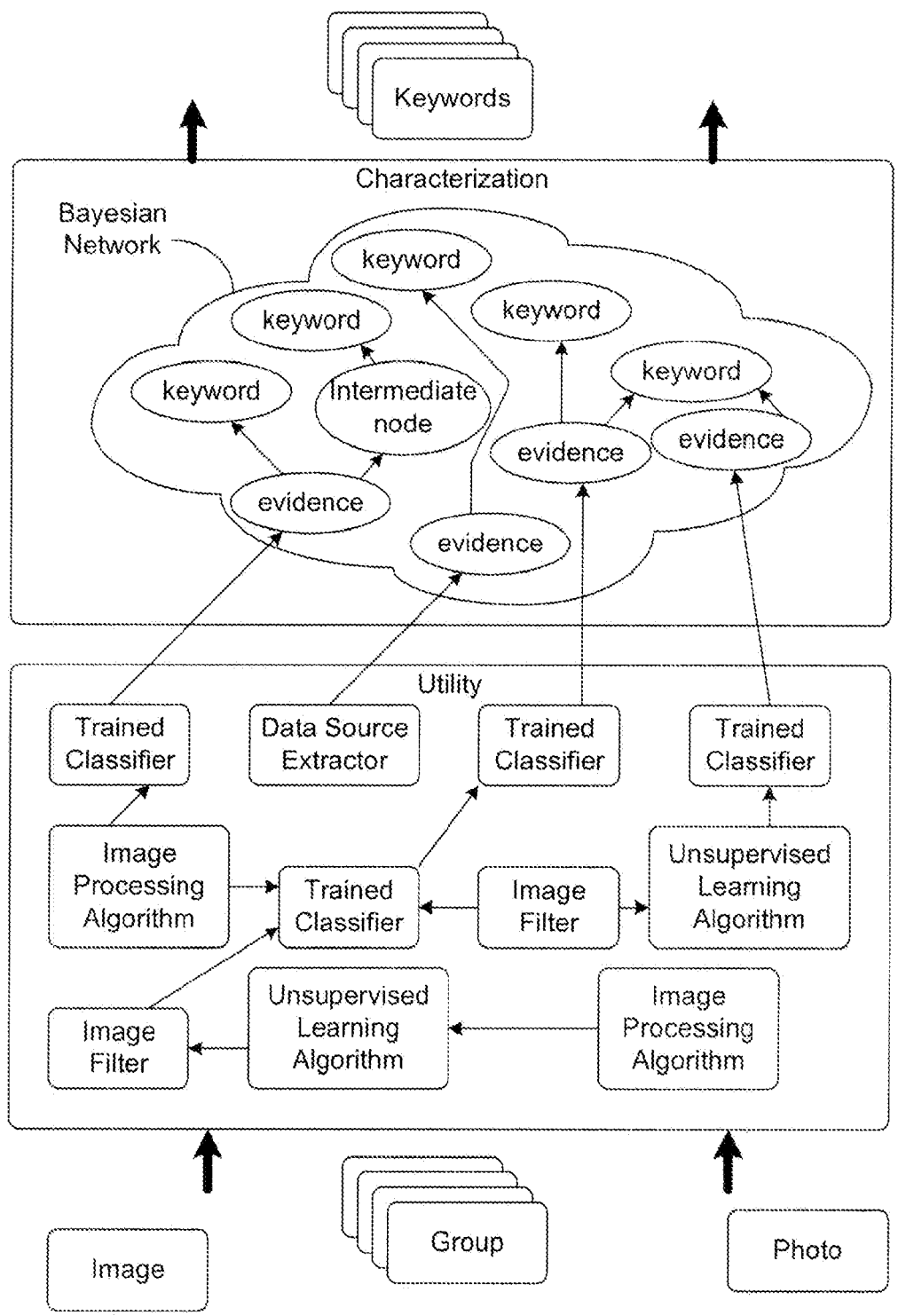
FIG. 4 shows the data processing apparatus implemented as a layer of utilities and a layer of characterizations.

FIG. 4 shows the data processing apparatus 215 implemented as a layer of utilities and a layer of characterizations. The computer system 105 can operate as two distinct layers named Utilities and Characterizations respectively. The Utilities layer can include application program interfaces (APIs) in each context that perform specific inferences such as clustering a group of photos into segments or determining predominant color regions in an image. The Utilities layer includes a series of classifiers such as trained classifiers, classifiers that comprise of unsupervised learning algorithms, and classifiers that comprise of other image processing algorithms that provide low- and intermediate-level inferences as well as incorporate external information in a form that can be used for correlation. Classifiers are described in the normal sense within a machine learning context as functions that map certain inputs to specific outputs that are semantically relevant. Trained classifiers are a specific kind of classifiers where the functional mapping is learnt by exposure to a set of inputs and their known correct outputs (supervised training set).

Within the Utilities layer, low-level image features are extracted from an image raster of pixel data through algorithms described henceforth as Feature Extractors which process an image and produce a vector of feature values. These Feature Extractors include but are not limited to deriving a normalized color histogram of an image, or producing statistics on edges within the image, or a variety of other low-level image analysis algorithms, for example. Trained Classifiers employ machine learning algorithms such as Support Vector Machines (SVM), Decision Trees/Forests (C4.5, for example, or Adaboost classifiers) to learn patterns within the produced low-level features (inputs) to recognize intermediate-level characteristics (semantically-relevant outputs).

External information is incorporated in the Utilities layer as specific classifiers. For example, a classifier is built that returns 1 if the word "wedding" appears in the title of an event represented within a group of photos and 0 otherwise. Other classifiers map other information into a prescribed set of responses that have semantic value to the Characterizations layer.

The Characterizations layer resides on top of the Utilities layer and provides a holistic probabilistic framework and keyword semantics (to reduce the coupling). Also, the Characterization layer performs the actual correlation of Utility layer classifiers and information to semantically-significant keywords. Some implementations of the computer system 105 can model the classifiers in the Utility layer and its interactions as a Bayesian network where Utility layer classifiers are represented as evidence nodes and keywords modeled as query nodes. Trained classifiers from the Utilities layer are represented as evidence nodes and treated as faulty detectors with a probabilistic influence on query nodes. This allows the computer system 105 to incorporate the known test error for the classifier in its assessments as in FIG. 4, for example. The correlations between the classifiers and the keywords are modeled as influence edges. The a priori and conditional probabilities of these influence edges as well as their configuration can be determined manually or can be generated by using as input the output responses of the classifiers in the Utilities layer and the known correct keywords for training set of photo groups, photos, or images depending on the context. If generating automatically, some implementations of computer system 105 can employ a Naive Bayes classifier to learn the required mapping of patterns of Utility layer classifiers to Characterizations layer semantically-significant keywords.

To know about a photo or group, the Characterization layer introduces an extensible language of keywords in which the computer system 105 can express arbitrary properties about a photo or group. These keywords exist internally to the computer system 105 as query nodes within the Bayesian network (see FIG. 4). The keyword query nodes can be modeled as influencing each other to express mutual exclusion amongst keywords or scale of degrees for ordinal keywords. These keywords are predefined and can be added to the computer system 105, for example, to the data storage 210, as they become useful and reliably ascertainable.

The data storage 210 can then be queried for simply the set of keywords that characterizes the photo or group. For example, each keyword associated with a Bayesian query node of more than 50% (default) probability will be included in the set, though the threshold is configurable based upon the risk tolerance of the caller for incorrect keywords. The keywords keep the open-world assumption that the existence of the keyword in the set means that the computer system 105 inferred it to likely be apt for the photo, but the absence of the keyword only indicates that computer system 105 was inconclusive about including the keyword.

The caller can then use simple triggers based upon the existence of a keyword in the set to initiate some intelligent behavior. The caller can also directly query the likelihood of a particular keyword directly if necessary. As an optimization, the Characterizations layer will be able to decide which evidence nodes to evaluate based upon the usefulness of its result (if it influences the keyword query node's likelihood sufficiently to include in the list of keywords). Considering that some classifiers or algorithms associated with some evidence nodes may be computationally intensive, this could improve performance significantly when asking for all characteristic keywords. It will be appreciated that techniques using Bayesian Networks are just one implementation by which images can be correlated. Other models for handling the probability analysis described above can be used either independently or in combination with Bayesian and/or other models.

Figure 5:
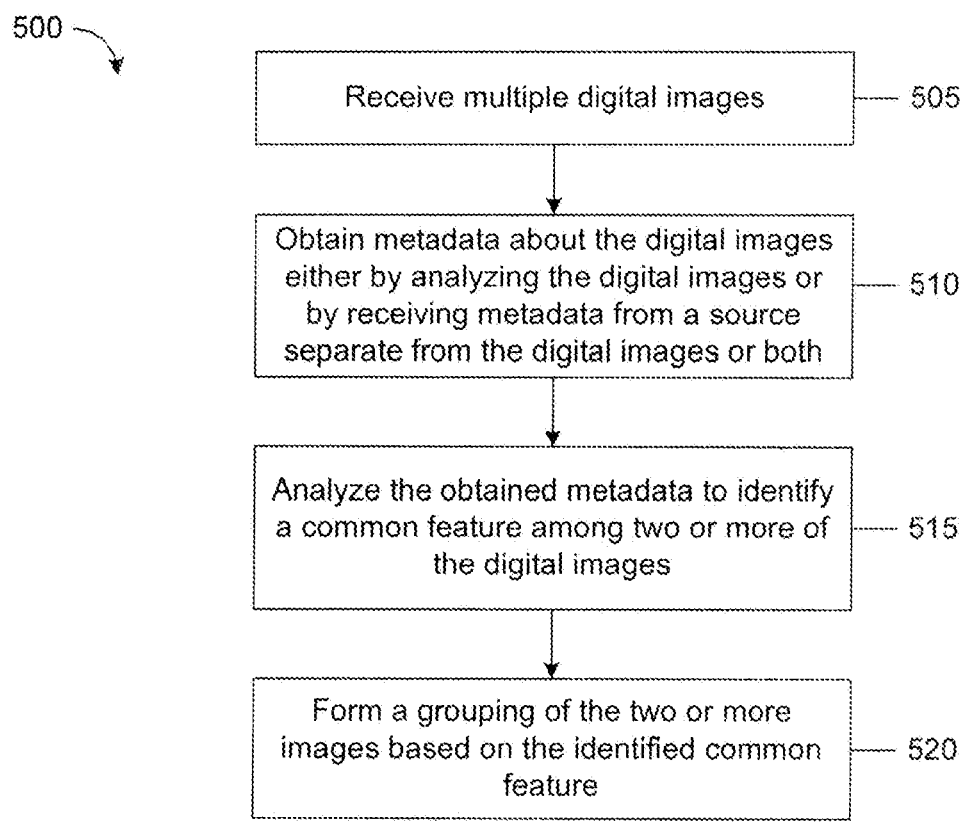
FIG. 5 shows a flowchart of an example process for forming groupings of two or more digital images.

FIG. 5 shows a flowchart of an example process 500 for forming groupings of two or more digital images. The process 500 can be implemented in a data processing system by computer software that performs the operations of the process, for example, a system like computer system 105. The process 500 receives multiple digital images at 505. The process 500 obtains metadata about the digital images either by analyzing the digital images or by receiving metadata from a source separate from the digital images or both at 510. The process 500 analyzes the obtained metadata to identify a common feature among two or more of the digital images at 515. The process 500 forms a grouping of the two or more images based on the identified common feature at 520.

In some implementations, the process 500 additionally can create a digital composite media presentation of the multiple digital images. In the presentation, the two or more images, grouped based on the identified common feature, can be presented concurrently. The analyzing, the forming, and the creating can be performed automatically without input. The process 500 can additionally execute the aforementioned operations to form clusters of digital images based on content of the images, features associated with the images, or both.

Figure 6:
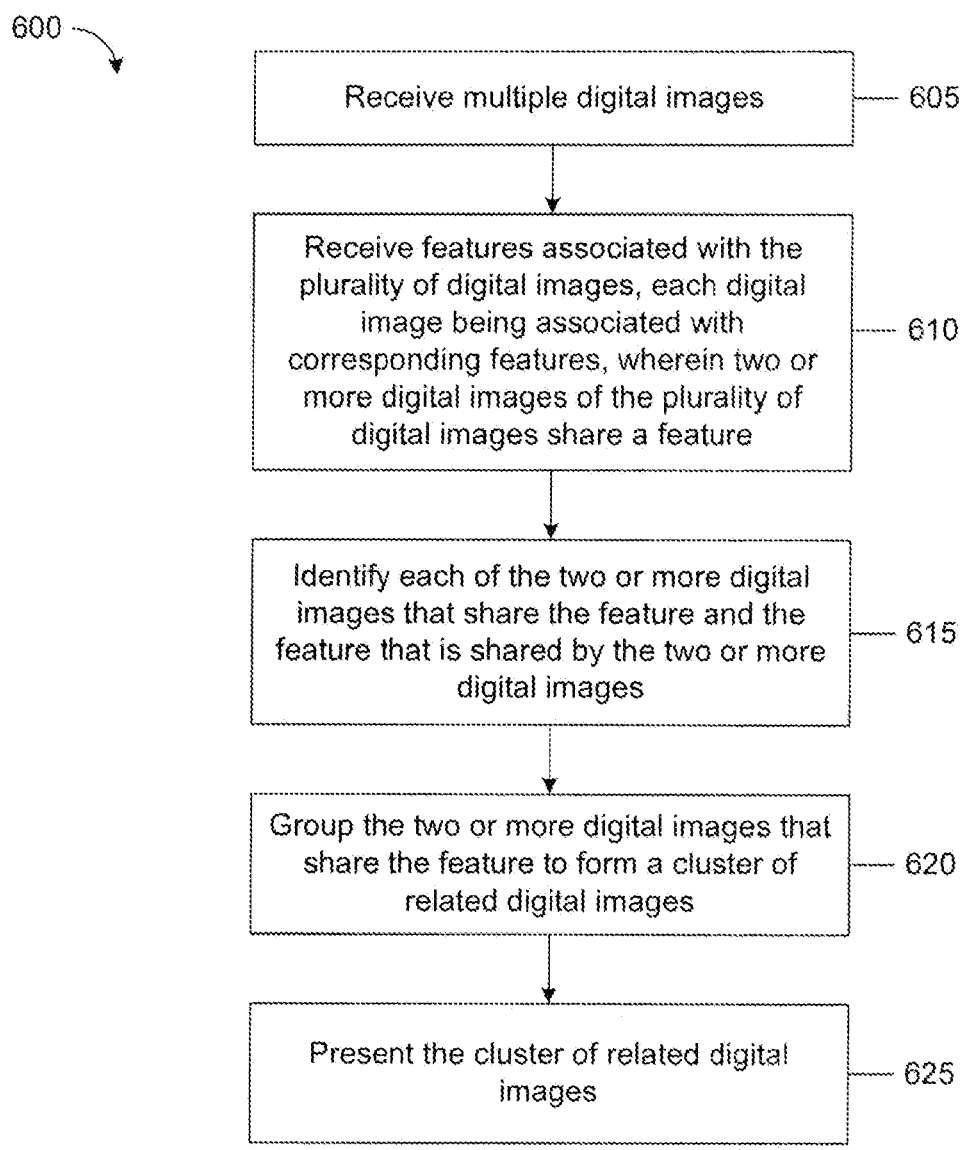
FIG. 6 shows a flowchart of an example process for presenting clusters of related digital images.

FIG. 6 shows a flowchart of an example process 600 for presenting clusters of related digital images. The process 600 can be performed by a data processing apparatus, for example, apparatus 215, executing computer software instructions tangibly encoded on a computer-readable medium. The process 600 receives multiple digital images at 605. The process 600 receives features associated with the multiple digital images at 610. Each digital image is associated with corresponding features. Two or more digital images share a feature. The process 600 identifies each of the two or more digital images that share the feature and the feature that is shared by the two or more digital images at 615. The process 600 groups the two or more digital images that share the feature to form a cluster of related digital images at 620. The process 600 presents the cluster of related digital images at 625.

Figure 7:
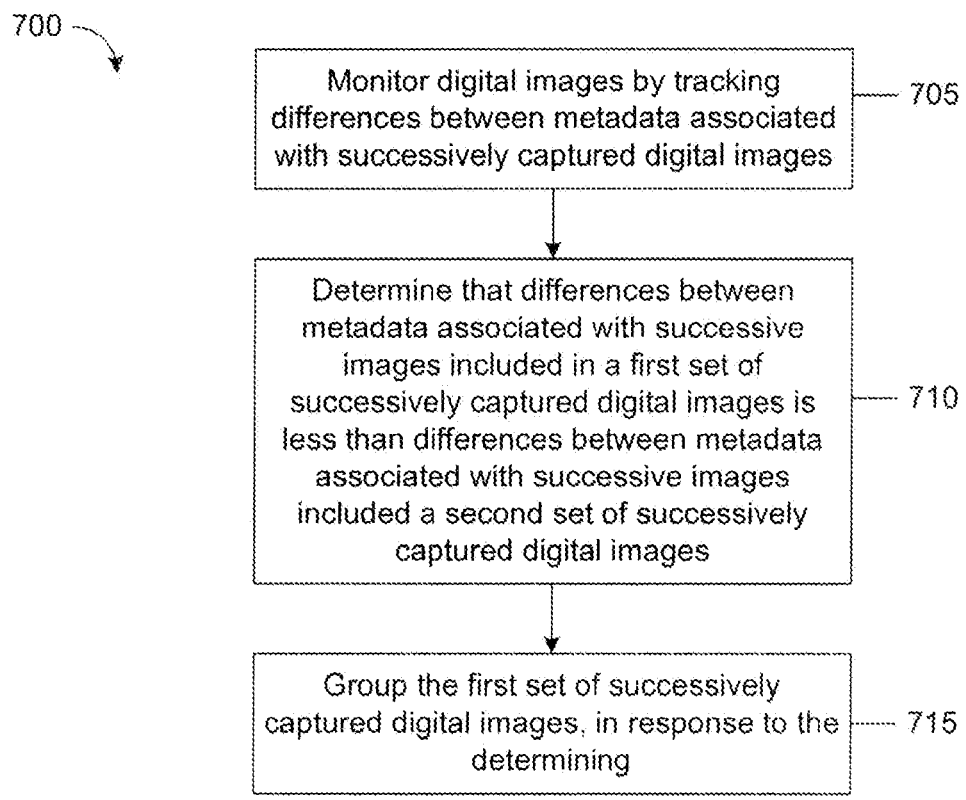
FIG. 7 shows a flowchart of an example process for grouping multiple successively captured images.

FIG. 7 shows a flowchart of an example process 700 for grouping multiple successively captured images. The process 700 can be executed by a system, for example, the computer system 105. The process 700 monitors digital images by tracking differences between metadata associated with successively captured digital images at 705. The process 700 determines that differences between metadata associated with successive images included in a first set of successively captured digital images is less than differences between metadata associated with successive images included a second plurality of successively captured digital images at 710. The process 700 groups the first set of successively captured digital images, in response to the determining at 715.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and an apparatus can also be implemented as, special purpose logic circuitry, for example, an FPGA (field programmable gate array) or an ASIC (application specific integrated circuit).

The processes and logic flows can further be implemented by one system of one or more computers to execute another system of one or more computers over one or more wired or wireless networks, such as the Internet. For example, the processes and logic flows can be encoded as one or more computer programs on computer-readable media, which are executed by the other system to perform the processes.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices.

Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's computing device in response to requests received from the web browser.

Embodiments of the subject matter described in this specification can be implemented in a computer system that includes a back end component, for example, as a data server, or that includes a middleware component, for example, an application server, or that includes a front end component, for example, a client computer having a graphical user interface or a Web browser through which a user can interact with an implementation of the subject matter described in this specification, or any combination of one or more such back end, middleware, or front end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computer system can include clients and servers. A client and server are generally remote from each other and typically interact through a communication network. The relationship of client and server arises by virtue of computer programs running on the respective computers and having a client-server relationship to each other. In some embodiments, a server transmits data (for example, an HTML page) to a computing device (for example, for purposes of displaying data and receiving user input from a user interacting with the computing device). Data generated at the computing device (for example, a result of the user interaction) can be received from the computing device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some implementations, the data processing apparatus 215 can be configured to execute statistical techniques to group digital images by clustering images relative to groups of other digital images. For example, the receiver 205 receives one hundred digital images ($I_1, I_2, \ldots, I_{100}$). Using techniques described previously, the data processing apparatus 215 identifies that twenty of the one hundred images were taken over a span of three days ($I_1$-$I_{20}$); after a gap of two years, another cluster of forty digital images ($I_{21}$-$I_{60}$) were captured within a span of five days; after another gap of one year, another cluster of forty digital images ($I_{61}$-$I_{100}$) were captured within a span of twenty minutes.

In the aforementioned example, the data processing apparatus 215 identifies the difference between times of capture of $I_1$ and $I_2$ ($\Delta t_{2/1}$), and similarly identifies $\Delta t$ for each successive pairs of digital images. Subsequently, the apparatus 215 identifies the largest value of $\Delta t$ and normalizes all the $\Delta t$ values by dividing each $\Delta t$ by the largest value. Subsequently, the apparatus 215 determines statistical outliers, for example, greater than 3 times the standard deviation away from the average normalized $\Delta t$. Values of $\Delta t$ that are determined to be statistical outliers represent breaks in the capture of digital images.

In some situations, some of the images in a cluster are associated with text received from a user while others are not. For example, either before or after a cluster is formed, the user can view the images in the cluster and associate captions with some of the images. The user can choose to view captions while viewing the images. Because only some of the images are associated with text, the data processing apparatus 215 displays captions only for those images for which the user has provided a caption.

The data processing apparatus 215 can automatically form the clusters as the digital images are imported to the computer system 105. Alternatively, the data processing apparatus 215 can receive and store the images, and subsequently receive input to form clusters. In response, the apparatus 215 can execute the aforementioned operations and processes to form clusters. In some implementations, the apparatus 215 can form clusters as the images are being received and before all the images have been received.

In some implementations, the data storage 210 can include multiple presentation templates based on which the data processing apparatus 215 creates the composite digital media presentations. For example, the templates can be a collection of slides, some of which have particular themes such as a vacation theme, a party theme, and the like. One of the templates can be a standard presentation template, i.e., a collection of slides without a theme, that the data processing apparatus 215 can select by default to create the presentation.

When the apparatus 215 forms a cluster and infers that the cluster represents a family vacation or a social gathering, the apparatus 215 automatically selects a template having a corresponding theme to present the cluster. Alternatively, when the apparatus 215 forms a cluster and determines that the cluster does not have a specified theme, then the apparatus 215 selects the standard presentation template, and presents the images in the cluster in the template.

In some implementations, the data processing apparatus 215 can receive multiple digital images at a first time; and form clusters as described above. At a subsequent second time, the apparatus 215 can receive additional digital images. The apparatus 215 can form clusters from among the additional digital images as well as new clusters from among the previously received and newly received digital images.

In some implementations, the data processing apparatus 215 can receive input from a user to form a cluster including two or more images. The apparatus 215 can identify additional images to include in the cluster based on the features associated with the images identified in the user's input. For example, as the user authors a composite digital media presentation, the user selects few digital images for including in the presentation. In response to input, the apparatus 215 then identifies additional digital images that can be included in the presentation, either automatically or in response to user input or both. It will be appreciated that the methods for presenting the clusters is not limited to slide shows. For example, clusters can be presented in digital representations of print products, such as books, cards, calendars, and the like. Hard copies of the print products can be generated based on the digital representations.

In some implementations, the data processing apparatus 215 can be configured to determine that a user traveled a long distance to capture a digital image based on statistical techniques. For example, for each digital image captured by the user at a geographic location, the apparatus 215 can determine a distance from the computer system 105. Based on the determination, the apparatus 215 can further determine an average distance traveled by the user to capture a digital image. if a distance between the computer system 105 and the geographic location of capture of a digital image is greater than 2 times the standard deviation of the mean, the apparatus 215 can determine that the user traveled a long distance to capture the digital image.

In some implementations, the composite media presentations in which the data processing apparatus 215 presents the clusters include digital notebooks including multiple sheets, each including one or more of the clustered images. In this manner, a digital notebook can include one cluster of images. The notebook can additionally include multiple clusters, each separated by a sheet signifying a break between the clusters.

What is claimed is:

1. A computer-implemented method comprising:
   receiving a plurality of digital images, each digital image including a plurality of faces of people, wherein a first face of a first person and a second face of a second person are common to at least two digital images of the plurality of digital images;
   obtaining an identity of the first person;
   determining, by data processing apparatus, a frequency of appearances of the first person and the second person in the plurality of digital images;
   deriving a relationship between the first person and the second person based on the frequency of appearances of the first person and the second person in the plurality of digital images and the identity of the first person;
   forming, by the data processing apparatus, a grouping of the at least two digital images that include the first face of the first person and the second face of the second person into a cluster, wherein features associated with the plurality of digital images include metadata associated with the digital images, wherein the at least two digital images grouped to form the cluster share at least a portion of the metadata, wherein the metadata includes times of capture and geographic locations of capture of the plurality of the digital images, wherein the operations for identifying each of the at least two digital images that share the feature further include:
      identifying digital images having times of capture within a duration of time; and
      forming a first cluster of the digital images having the times of capture within the duration;
   identifying, from among the first cluster, digital images having geographic locations of capture within a region; and
   forming a second cluster of the digital images within the first cluster, wherein the digital images in the second cluster having the geographic locations of capture within the region;
   deriving one or more keywords describing the two or more images by analyzing content of each of the two or more images;
   identifying a theme for the two or more images in the grouping based at least in part on the keywords and at least in part on the relationship between the first person and the second person; and
   creating a digital composite media presentation of the at least two digital images according to the themeby:
      including the digital images in the first cluster in a first sequence in the digital media presentation, and
      including the digital images in the second cluster in a second sequence within the first sequence in the digital media presentation; and
   presenting the digital composite media presentation.

2. The method of claim 1, wherein creating the digital composite media presentation of the at least two digital images comprises presenting the at least two digital images concurrently according to the theme.

3. The method of claim 2, wherein the determining, the deriving, the forming, and the creating are performed automatically without input.

4. The method of claim 1, further comprising obtaining image information about the plurality of digital images by analyzing the plurality of digital images, wherein for each digital image, the image information includes pixel information identifying a content captured in the digital image.

5. The method of claim 1, wherein deriving the relationship between the first person and the second person and grouping the at least two digital images that include the first face of the first person and the second face of the second person into the cluster comprises:
  analyzing image information about a first digital image to determine that content in the first digital image includes a plurality of faces including the first face;
  analyzing image information about a second digital image to determine that content in the second digital image includes the second face included in the plurality of faces in the first digital image; and
  forming a grouping of the first digital image and the second digital image in response to determining that content in the second digital image includes the second face included in the plurality of faces in the first digital image.

6. The method of claim 5, further comprising:
  presenting the first digital image; and
  presenting an animation, the animation including zooming in on the face included in the second digital image that is also included in the plurality of faces in the first digital image in real time.

7. A non-transitory computer-readable medium tangibly encoding computer software instructions executable by data processing apparatus to perform operations comprising:
  receiving a plurality of digital images, each digital image including a plurality of faces of people, wherein a first face of a first person and a second face of a second person are common to at least two digital images of the plurality of digital images;
  receiving an identity of the first person;
  identifying a frequency of appearances of the first person and the second person in the plurality of digital images;
  deriving a relationship between the first person and the second person based on the frequency of appearances of the first person and the second person in the plurality of digital images and the identity of the first person;
  grouping the at least two digital images that include the first face of the first person and the second face of the second person into a cluster, wherein features associated with the plurality of digital images include metadata associated with the digital images, wherein the at least two digital images grouped to form the cluster share at least a portion of the metadata, wherein the metadata includes times of capture and geographic locations of capture of the plurality of the digital images, wherein the operations for identifying each of the at least two digital images that share the feature further include:
    identifying digital images having times of capture within a duration of time; and
    forming a first cluster of the digital images having the times of capture within the duration;
    identifying, from among the first cluster, digital images having geographic locations of capture within a region; and
    forming a second cluster of the digital images within the first cluster, wherein the digital images in the second cluster having the geographic locations of capture within the region;
  identifying a theme associated with the two or more digital images based at least in part on the relationship between the first person and the second person;
  creating a digital composite media presentation that includes the cluster according to the theme by:
    including the digital images in the first cluster in a first sequence in the digital media presentation, and
    including the digital images in the second cluster in a second sequence within the first sequence in the digital media presentation; and
  presenting the digital composite media presentation.

8. The medium of claim 7, wherein identifying the theme comprises selecting a presentation template from a plurality of presentation templates, each presentation template associated with a respective theme, the selected presentation template associated with the identified theme, and wherein the cluster is included in the digital composite media presentation according to the selected presentation template.

9. The medium of claim 7, wherein the plurality of digital images are received as a sequence, and wherein the digital images included in the cluster are out of sequence.

10. The medium of claim 7, wherein the features associated with the plurality of digital images include pixel information representing faces of persons, the operations further comprising:
  analyzing a first digital image to identify the first face of the first person;
  analyzing a second digital image to identify the second face of the second person;
  determining that the second face included in the second digital image is included among the plurality of faces in the first digital image; and
  grouping the first digital image and the second digital image to form the cluster of related digital images in response to the determining.

11. The method of claim 1, wherein deriving one or more keywords describing the two or more images by analyzing content of each of the two or more images comprises:
  inferring data describing the two or more images in the grouping based at least in part on content of the two or more digital images and the common feature, wherein the inferred data is different from the metadata; and
  forming a set of semantically-significant keywords about the two or more digital images in the grouping.

12. The method of claim 11, wherein the two or more images are arranged in a hierarchy, and wherein inferring the data describing the two or more images in the grouping comprises:
  analyzing low-level image features of the two or more images; and
  correlating the low-level image features into higher-level features.

13. The medium of claim 7, the operations further comprising:
  inferring data describing the at least two digital images based at least in part on content of the at least two digital images; and
  forming a set of semantically-significant keywords about the at least two digital images.

14. The medium of claim 7, wherein the at least two digital images are arranged in a hierarchy, and wherein inferring the data that is shared by the at least two digital images comprises:
  analyzing low-level image features of the at least two digital images; and
  correlating the low-level image features into higher-level features.

15. A system comprising:
data processing apparatus; and
a non-transitory computer-readable medium tangibly encoding computer software instructions executable by the data processing apparatus to perform operations comprising:
receiving a plurality of digital images, each digital image including a plurality of faces of people, wherein a first face of a first person and a second face of a second person are common to at least two digital images of the plurality of digital images;
receiving an identity of the first person;
identifying a frequency of appearances of the first person and the second person in the plurality of digital images;
deriving a relationship between the first person and the second person based on the frequency of appearances of the first person and the second person in the plurality of digital images and the identity of the first person;
grouping the at least two digital images that include the first face of the first person and the second face of the second person into a cluster, wherein features associated with the plurality of digital images include metadata associated with the digital images, wherein the at least two digital images grouped to form the cluster share at least a portion of the metadata, wherein the metadata includes times of capture and geographic locations of capture of the plurality of the digital images, wherein the operations for identifying each of the at least two digital images that share the feature further include:
identifying digital images having times of capture within a duration of time; and
forming a first cluster of the digital images having the times of capture within the duration;
identifying, from among the first cluster, digital images having geographic locations of capture within a region; and
forming a second cluster of the digital images within the first cluster, wherein the digital images in the second cluster having the geographic locations of capture within the region;
identifying a theme associated with the two or more digital images based at least in part on the relationship between the first person and the second person;
creating a digital composite media presentation that includes the cluster according to the theme by:
including the digital images in the first cluster in a first sequence in the digital media presentation, and
including the digital images in the second cluster in a second sequence within the first sequence in the digital media presentation; and
presenting the digital composite media presentation.

16. The system of claim 15, wherein identifying the theme comprises selecting a presentation template from a plurality of presentation templates, each presentation template associated with a respective theme, the selected presentation template associated with the identified theme, and wherein the cluster is included in the digital composite media presentation according to the selected presentation template.

17. The system of claim 15, wherein the plurality of digital images are received as a sequence, and wherein the digital images included in the cluster are out of sequence.

18. The system of claim 15, wherein the features associated with the plurality of digital images include pixel information representing faces of persons, the operations further comprising:
analyzing a first digital image to identify the first face of the first person;
analyzing a second digital image to identify the second face of the second person;
determining that the second face included in the second digital image is included among the plurality of faces in the first digital image; and
grouping the first digital image and the second digital image to form the cluster of related digital images in response to the determining.

19. The system of claim 15, the operations further comprising:
inferring data describing the at least two digital images based at least in part on content of the at least two digital images; and
forming a set of semantically-significant keywords about the at least two digital images.

20. The system of claim 19, wherein the at least two digital images are arranged in a hierarchy, and wherein inferring the data that is shared by the at least two digital images comprises:
analyzing low-level image features of the at least two digital images; and
correlating the low-level image features into higher-level features.

* * * * *

UNITED STATES PATENT AND TRADEMARK OFFICE
CERTIFICATE OF CORRECTION

PATENT NO. : 8,611,678 B2  
APPLICATION NO. : 12/891252  
DATED : December 17, 2013  
INVENTOR(S) : Eric Hanson, Joshua David Fagans and Hemal Shah Page 1 of 1

It is certified that error appears in the above-identified patent and that said Letters Patent is hereby corrected as shown below:

Title Page

On Page 2, Item (56) In Column 2 (Other Publications), In Line 1, Delete "hppt:" and insert -- http: --, therefor.

On Page 2, Item (56) In Column 2 (Other Publications), In Line 26, Delete "Proeedings" and insert -- Proceedings --, therefor.

On Page 2, Item (56) In Column 2 (Other Publications), In Line 29, Delete "Datellite" and insert -- Satellite --, therefor.

In the Claims

In Column 22, In Line 52, In Claim 1, delete "themeby:" and insert -- theme by: --, therefor.

Signed and Sealed this
Twenty-ninth Day of April, 2014

Michelle K. Lee
*Deputy Director of the United States Patent and Trademark Office*